INVENTOR
P. T. BRADY
BY [signature]
ATTORNEY

Nov. 7, 1967 P. T. BRADY 3,351,720

ECHO SUPPRESSOR FOR COMMUNICATION SYSTEM HAVING TRANSMISSION DELAY

Filed Aug. 31, 1964 2 Sheets-Sheet 2

United States Patent Office 3,351,720
Patented Nov. 7, 1967

3,351,720
ECHO SUPPRESSOR FOR COMMUNICATION SYSTEM HAVING TRANSMISSION DELAY

Paul T. Brady, Maplewood, N.J., assignor to Bell Telephone Laboratories, Incorporated, New York, N.Y., a corporation of New York Filed Aug. 31, 1964, Ser. No. 393,327
4 Claims. (Cl. 179—170.2)

ABSTRACT OF THE DISCLOSURE

The detection of speech from the distant party before speech from the local party by a time comparator circuit in a split echo suppressor causes all transmission to the distant location to be absolutely suppressed thereby prohibiting transmission of echo signals and intentional interruptions by the local party. If the local party does attempt to intentionally interrupt, a substantial but decreasing attenuation is inserted into his transmission path in order to prevent the distant party from receiving an immediate high-level signal if the latter party should cease talking and thereby permit the interrupting speech of the local party to pass. When speech from the local party is detected before speech from the distant party, the comparator circuit causes a substantial attenuation to be inserted in the receiving path of the echo suppressor in response to speech from the distant party thereby permitting low-level communications between the parties when the interruption was unintentional.

Figure 1:
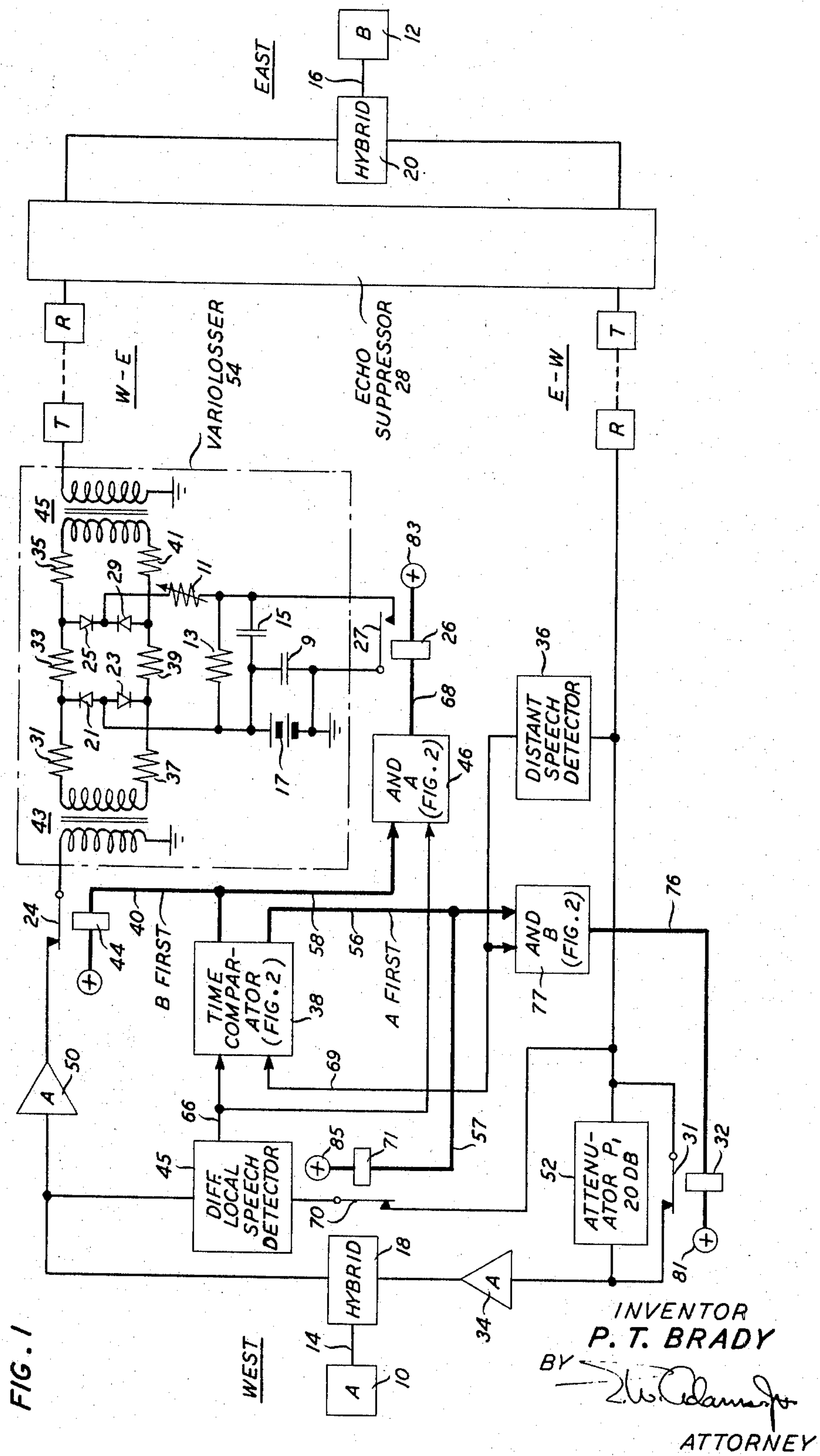

This invention relates to the arrangement of an echo suppressor to minimize noticeable mutilation of speech and other subjectively irritating phenomena caused by interruptions of one party by another in a communication system having substantial transmission delays.

It is well known that echoes may be generated whenever local telephone or other two-way circuits are interconnected by paired one-way carrier or radio links. Echoes occur because the interconnections between these circuits cannot be perfectly balanced. Thus, a portion of speech arriving at an interconnecting network from one one-way path will traverse the interconnecting network and be returned through the other one-way path to the speaker as an echo.

When the transmission delay is of the order of 300 milliseconds each way, as may occur, for example, in a satellite communication system, either such echoes or the operation of conventional echo suppressor arrangements can disrupt a normal conversation, as explained in the copending application of M. S. Schoeffler, Ser. No. 320,150, filed Oct. 30, 1963, and assigned to the assignee hereof. Many sudden changes in the level of the received signals may be caused by the operation of the echo suppressors in such a system.

Certain sudden level changes can be highly irritating to listeners. Applicant has recognized that such irritations are undesirable even when there is no substantial loss in the information transmitted. Applicant has further realized that, to the extent speech is blocked by echo suppressors, the loss of information is less serious when one party knows he has interrupted the other than when neither party is aware that he has interrupted the other.

Accordingly, it is an object of this invention to suppress intentionally interrupting remarks in a two-way communication system while transmitting all other remarks in a way that is not unduly irritating to the parties to the conversation.

A further object of the invention is to arrange an echo suppressor for a two-way communication system having substantial transmission delays so that highly specialized treatment is afforded to remarks of both parties to a conversation whenever, because of the transmission delays, neither party is aware that he has interrupted the other.

According to the invention the foregoing objects are achieved in a split terminal echo suppressor arrangement by applying an indication that signals from a distant party arrived before signals from a local party to suppress the local party's intentionally interrupting signals and while the indication is concurrent with the interrupting signals to prepare the one-way path to the distant party for transmission of the local party's speech signals at a gradually increasing volume level after signals cease to be received from the distant party and by applying an indication that signals from the local party arrived before signals from a distant party to attenuate the interrupting signals (from the distant party) to a level that is audible but lower than the signals of the local party. Since, at either end of the system, intentionally interrupting speech signals are absolutely suppressed near their point of origin, the attenuated interrupting speech signals can be received only when each party spoke before the other party's speech could reach him. In this case, unintentional interruption occurs at each end of the system.

The transmission of intentionally interrupting local speech signals at a gradually rising volume level after the distant party stops speaking has the merit that the distant party will not be irritated by the fact that the local party's remarks may appear to begin in mid-sentence. On the other hand, a sudden increase in level of unintentionally interrupting speech signals from the distant party occurs when the local party stops speaking. This increase in level should seem natural and not irritating to the local party, since he would naturally desire to hear clearly the remarks he has already perceived at low level and to which he has stopped to listen.

A feature of the invention involves applying an indication that the local party spoke first to disable the distant speech signal input of a differential local speech detector of the type conventional in echo suppressors. As a result, each party will obtain complete control of his differential speech detector whenever he speaks before speech signals arrive from the distant party. This feature insures that a loud-talking, unintentionally-interrupting distant speaker cannot completely suppress the speech of a local party who apparently spoke first at his end of the circuit.

Figure 2:
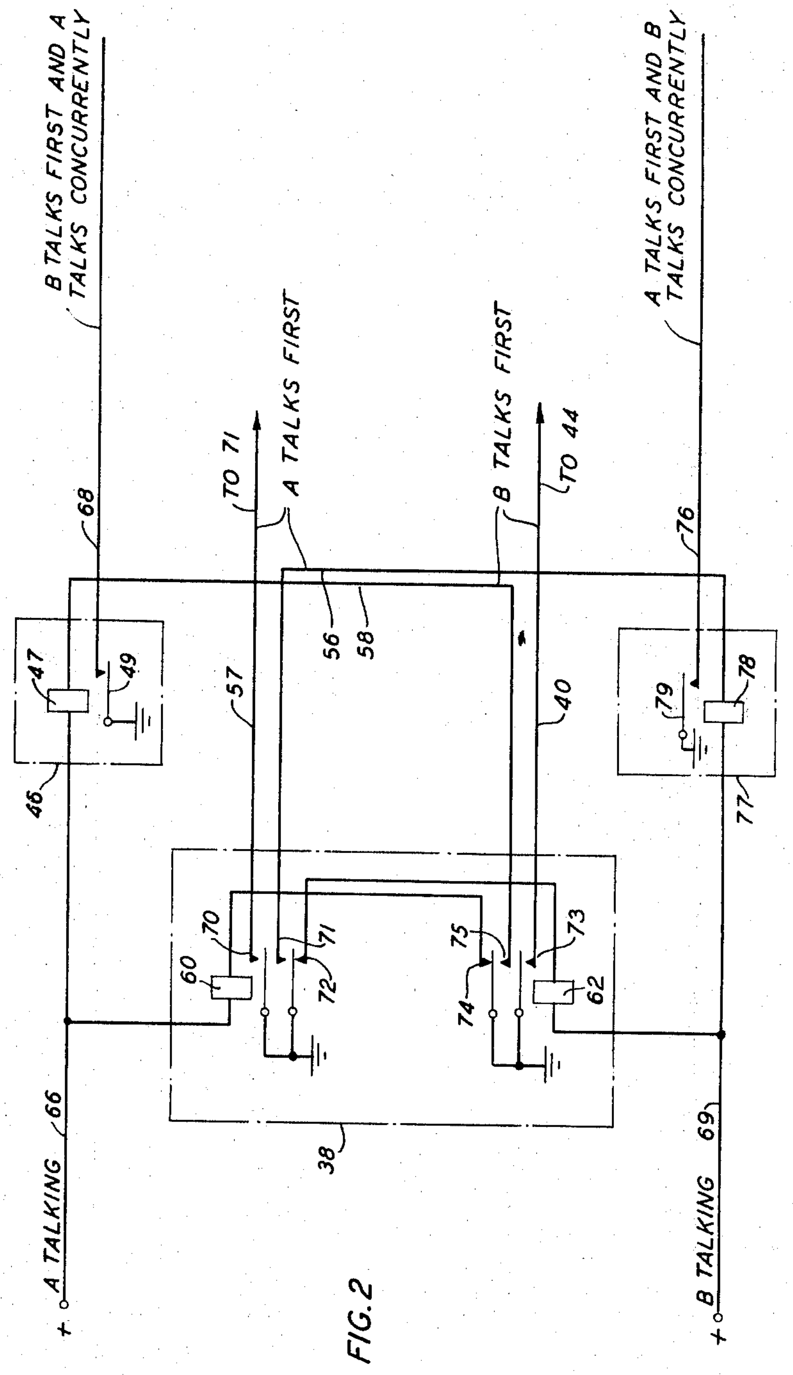

The invention may be more fully appreciated from the following detailed description and the drawing in which:

FIG. 1 is a partially schematic and partially block diagrammatic illustration of a preferred embodiment of the invention; and FIG. 2 is a schematic illustration of a preferred arrangement of the time comparator and AND gates shown in the embodiment of FIG. 1.

As shown in FIG. 1 of the drawing, the invention is embodied in a telephone system in which two subscribers, A and B, are interconnected by their respective local telephone apparatus 10 and 12, conventional two-way circuits 14 and 16 such as two-wire lines, and hybrid networks 18 and 20, respectively, to a transmission facility involving two one-way circuits each of which may, for example, comprise a two-wire carrier circuit or a radio transmission link having a transmitter T and a receiver R at opposite ends of the link. In either case, the one-way circuits have substantial transmission delay. The W–E circuit is adapted to transmit signals from West to East; and the E–W circuit is adapted to transmit signals from East to West.

For convenience of description, the circuitry extending from the party A's local apparatus 10 to his respective transmitter T and receiver R may be referred to hereinafter as the West terminal and that from party B's local apparatus 12 to his respective transmitter T and receiver R as the East terminal.

The parties may be referred to simply as A and B.

The echo suppressor of the invention is shown in FIG. 1 in the form of a split terminal echo suppressor wherein identical suppressor circuitry is located at the two terminals of the two-way communication system. The circuitry within the East terminal echo suppressor 28 is arranged with respect to its associated transmitter T and receiver R in the same way as the echo suppressor circuitry of the West terminal is arranged, as explained hereinafter in detail, with respect to its associated transmitter T and receiver R.

In the West terminal, the one-way W–E transmission path from party A extends from hybrid network 18 through an amplifier 50, a suppression switch 24, and a variolosser 54 to the West transmitter T. The one-way E–W transmission path to party A extends from West receiver R through the parallel combination of an attenuator 52 and a switch 31 and through an isolation amplifier 34 to hybrid network 18.

It is conventional in the echo suppressor art that the suppression switch 24 will be opened under some conditions while B is speaking in order to prevent B from hearing a delayed echo of his speech; and a suppression switch similarly placed in echo suppressor 28 with respect to its transmitter T will be opened under analogous conditions when A is speaking in order to prevent A from hearing a delayed echo of his speech. It is also conventional in the echo suppression art under conditions of simultaneous or "double" talking by parties A and B that neither switch 24 nor its counterpart in echo suppressor 28 will be open; and sufficient loss must be inserted in the loop to prevent singing and to reduce echoes to a tolerable level. Usually, such a loss, in the position of attenuator 52, is of the order of 6 db in order to make "break-in," that is, intentional interruption of the speaking party, relatively easy.

In a circuit according to the present invention, intentional interruption is prohibited and during unintentional interruption attenuator 52 and its counterpart in suppressor 28 supply relatively large losses of the order of 20 db each. Parties A and B then hear each other at a fraction of normal volume, unlike the "break-in" volume levels utilized in the prior art.

To provide these and other modifications in conventional echo suppressor concepts, a circuit according to the invention is arranged in the following manner.

The presence of A's speech in the W–E path is detected by a differential local speech detector 45, which is of the type described in the above-cited copending application of M. S. Schoeffler. In brief, one input of detector 45 is connected in the W–E path at a point preceding isolation amplifier 50 and suppression switch 24; and another input of detector 45 is connected through a switch 70 to the E–W path at a point preceding attenuator 52 to provide a reference voltage level that A's speech signals can exceed but B's echo cannot exceed.

Distant speech detector 36 has an input connected to the E–W path preceding attenuator 52 to detect the presence of B's speech.

It is noted that A's echo is prevented from producing a false indication at this point by the action of echo suppressor 28.

The outputs of detectors 45 and 36 are connected to the inputs 66 and 69, respectively, of a time comparator circuit 38, to be described in more detail hereinafter in connection with FIG. 2. If A's speech signals are detected first, a ground condition appears on output leads 56 and 57 of comparator 38 so long as A continues to speak and the leads 56 and 57 are respectively connected to an input of an AND gate 77 and to a relay armature 71, which opens its controlled contacts switch 70 in the E–W path input to local speech detector 45. A voltage source 85 is connected to the other terminal of relay armature 71 and is effective to operate armature 71 whenever ground appears on lead 57. If B's speech signals are detected first, a ground condition appears on output leads 58 and 40 of comparator 38 so long as B continues to speak and the leads 56 and 40 are respectively connected to an input of an AND gate 46 and to a relay armature 44, which opens its controlled contacts which comprise suppression switch 24 in the W–E path.

The output lead 69 of distant speech detector 36 is connected to the other input of AND gate 77. Whenever A's detected priority has produced a ground condition at the lead 56 input while detector 36 applies a voltage to the input lead 69 of AND gate 77, an output ground condition appears on an output lead 76 of AND gate 77 so long as both A and B continue to speak and is applied by an appropriate connection to one terminal of the relay armature 32. A voltage source 81 is connected to the other terminal of relay armature 32 and is effective to operate armature 32 whenever ground appears on connection 76 to open its controlled contacts which comprise switch 31 shunting attenuator 52 in the E–W path.

The output lead 66 of local speech detector 45 is connected to the other input of AND gate 46. Whenever B's detected priority has produced a ground condition at the lead 58 input of AND gate 46 and detector 45 applies a voltage to the lead 66 input of AND gate 46 in response to A's speech signals, an output ground condition appears on an output lead 68 of AND gate 46 so long as both A and B continue to speak and is applied by an appropriate connection to one terminal of the relay armature 26. Relay armature 26 closes a switch 27 to complete a forward-biasing path for shunt-type variolosser 54 through a voltage source 17. A voltage source 83 is connected to the other terminal of relay armature 26 and is effective to operate armature 26 whenever ground appears on lead 68.

In variolosser 54, a capacitor 15 is connected across the series combination of a battery 17 and a switch 27 to charge whenever switch 27 is closed. A resistor 13 and the nonlinear diode portion of the variolosser circuit are connected in parallel across capacitor 15 to discharge it with a time constant of about 300 ms. Diodes 21, 23, 25 and 29 are connected in a parallel circuit in series with an adjustable resistor 11 across capacitor 15 in the appropriate polarity to carry part of the discharge current. Specifically, the anodes of diodes 21 and 23 are connected to the positive terminal of source 17; and the cathodes of diodes 25 and 29 are connected through switch 27 to the negative terminal of source 17. One branch of the parallel circuit includes diodes 21 and 25 with a bias current limiting resistor 33 connected serially therebetween, and the other branch of the parallel circuit includes diodes 23 and 29 with a bias current limiting resistor 39 connected therebetween. Voltage dropping resistors 31 and 37 and an isolation transformer 43 connect diodes 21 and 23 through switch 24 across the output of isolation amplifier 50 in balanced fashion, so that voice signals in the W–E path simultaneously increase the current in one diode and decrease the current in the other diode. Similarly, voltage dropping resistors 35 and 41 and an isolation transformer 45 connect diodes 25 and 29 in balanced fashion across the input of transmitter T in the W–E path.

In operation, whenever B's speech is detected by detector 36 and thereafter A's speech is detected by detector 45, the delays between A's local apparatus 10 and these detectors is small enough that A has almost certainly intentionally interrupted B. Such intentional interruption is absolutely suppressed, since time comparator 38 produces an output on leads 58 and 40 that energizes armature 44 and opens suppression switch 24. If, on the other hand, B intentionally interrupts A, as detected by B's local echo suppressor 28, then similar absolute suppression occurs in suppressor 28 preceding its transmitter T in the E–W path.

If A intentionally interrupts B and both continue to talk, both inputs of AND gate 46 will be energized; and AND gate 46 will produce a ground condition on its output lead 68. Armature 26 will be energized, and switch 27 will be closed by armature 26. Capacitor 15 will be immediately charged and nonlinear diodes 21, 23, 25 and 29 will be forward-biased to a low impedance. However, A's speech signals cannot reach either variolosser 54 or B because they are suppressed by the open condition of switch 24.

If B should now stop talking while A continues to talk, voltage will disappear from connections 58 and 40. Armature 4 4is de-energized and switch 24 closes. Most of the voltage of A's speech signals is dropped across resistors 31 and 37 because of the continuing low-impedance condition of diodes 21, 23, 25 and 29, since capacitor 15 cannot discharge instantaneously; and part of the voltage of A's speech signals that appears across the diodes is dropped across resistors 35 and 41, so that very little signal voltage reaches isolation transformer 45. This condition is the high loss condition of the variolosser. As capacitor 15 discharges during the next 300 ms., the current in diodes 21, 23, 25 and 29 decreases and their impedance rises. The transmission loss of variolosser 54 gradually decreases and B hears A's speech at gradually increasing volume. A's speech will not sound to B as if it were suddenly turned on by a switching device; and B may not be aware of the clipping to which A's intentionally interrupting speech has been subjected. If B is aware that A's remarks appear to begin in mid-sentence, he will be concerned about this only if important information appears to have been lost. The subjective irritation of B caused by a sudden loud break-in of incomplete interrupting speech does not occur. Admittedly some information is lost, but the circuit sounds good. Also, A will frequently recognize B's failure to hear him and will repeat his remarks without wasting time to blame the circuit.

Whenever A's speech signals are detected by detector 45 and thereafter B's speech signals are detected by detector 36, B's speech signals were evidently not suppressed by B's local echo suppressor 28. Therefore, B's speech signals must have been detected before A's speech signals by suppressor 28. It follows that B is unintentionally interrupting A, so far as A's local suppressor circuitry can determine; and A is unintentionally interrupting B so far as B's local suppressor 28 can determine. That is, both parties' speech signals were transmitted as noninterrupting, but did in fact interrupt the other party's speech signals upon reception at the other end of the communication system because of the long delay therein. In fact, it is not possible to determine which party actually spoke first without knowing the exact transmission delays of the W–E and E–W one-way paths. Especially in satellite systems it is not economically practical to predict the exact values of these delays and to use them to control the echo suppressors. The present circuit makes it unnecessary to know the delays.

In the condition just described, as well as in the condition in which A speaks alone, time comparator 38 produces an output ground condition on output lead 56; and this ground condition is applied to one input of AND gate 77 and to armature 71 which opens switch 70 in the E–W path input to the differential local speech detector 45. If B has unintentionally interrupted A as described above, the opening of switch 70 will prevent him from shouting down A to gain control of detector 45, comparator 38, and armature 44 to open switch 24. Thus, B is totally unable to suppress A's speech; and, because of similar construction of echo suppressor 28, A will be totally unable to suppress B's speech in the situation in which neither has intentionally interrupted the other.

Whenever both A and B talk in a case of unintentional interruption, comparator 38 will indicate that A was first, creating a ground condition on the lead 56 input of AND gate 77 and detector 36 will continue to detect B's speech signals, applying a voltage to the other input of AND gate 77, as explained above. Both inputs of AND gate 77 will be energized; and AND gate 77 will produce a ground condition on its output lead 76. Armature 32 will be energized and will open switch 31, thereby subjecting B's speech signals to the 20 db loss of attenuator 52. A similar operation will occur in echo suppressor 28 in the W–E path following its receiver R.

Each party will hear the other party at a very low level, but will probably not hear his own echo, which must traverse both 20 db losses as well as the very high trans-hybrid loss at the other party's end of the line.

If either party stops to listen to the other, he will immediately hear the other's remarks at full volume as he would naturally desire. For example, if A stops to listen to B, the output signal on lead 66 of detector 45 disappears; and the "A first" signal on lead 56 from time comparator 38 ceases. Ground disappears from lead 76 at the output of AND gate 77. Armature 32 is de-energized, switch 31 closes and attenuator 52 no longer attenuates B's speech signals. A sudden increase in volume of B's speech signals is not objectionable in this case because A has heard B's low-level signals and presumably wants to hear more clearly what B is saying. A hangover of 120 milliseconds for the output signal on lead 56 of comparator 38 gives A the opportunity to make a very short pause without increasing the strength of B's signals.

Thus, if A so desires he can continue to ignore B's low-level signals, which are not loud enough to be very irritating to A. Consequently, the parties have an opportunity to exercise some judgment about who should stop talking in the situation of unintentional interruption at both ends of the line. This opportunity does not exist in the previous suppressor circuits that allow easy break-in in long-delay systems because a loud interruption is sufficiently irritating to most parties to cause them to stop talking immediately and then restart, but not enough ahead of the other party to gain control of the conversation in view of the long delay in the circuit.

Such repeated stops and starts whenever unintentional interruptions occur at both ends of the circuit tend to be avoided or at least reduced by a circuit arrangement according to the present invention.

In FIG. 2, preferred circuits for time comparator 38 and AND gates 46 and 77 are illustrated. Time comparator 38 includes a relay armature 60 and normally closed switch contacts 74 connected serially between an input lead 66 and ground, contacts 74 being controlled by a relay armature 62, and further includes relay armature 62 and normally closed switch contacts 72 connected between an input lead 69 and ground, contacts 72 being controlled by relay armature 60. Whenever a voltage appears on lead 66 before a voltage appears on lead 69, armature 60 opens switch 72 to break the energizing path for armature 62 and closes its controlled switch contacts 70 and 71 to place grounds on leads 57 and 56 respectively, which are one input of AND gate 77 and the ground lead of relay armature 71, respectively. If a voltage now appears on lead 69 while voltage remains on lead 66, relay armature 78 in AND gate 77 will close its controlled contacts, which comprise switch 79, to place a ground on lead 76, which is the ground lead of relay armature 32.

When a voltage appears on lead 69 before a voltage appears on lead 66, armature 62 opens switch 74 to break the energizing path for armature 60 and closes its controlled switch contacts 73 and 75 to place grounds on leads 40 and 58, which are the ground lead for relay armature 44 and one input of AND gate 46, respectively. If a voltage now appears on lead 66 while a voltage remains on lead 69, relay armature 47 in AND gate 46 will close its controlled contacts, which comprise switch 49, to place a ground on lead 68, which is the ground lead of armature 26.

When armature 60 has been operated and then voltage disappears from lead 66, armature 60 will release after a hangover of 120 milliseconds, which insures that A may pause very briefly in the situation of unintentional interruption at both ends of the line without receiving a blip of increased volume from B.

When armature 62 has been operated and then voltage disappears from lead 69, armature 62 will release after a hangover of 85 milliseconds, which insures that B may pause very briefly in the situation in which A's remarks are suppressed without losing absolute suppression of A's remarks.

What is claimed is:

1. In combination in a two-way communication system, first and second terminals each comprising a two-way transmission path and two one-way transmission paths, said one-way transmission paths of said first terminal being connected to said one-way transmission paths of said second terminal to provide two-way communication between said two-way paths, and a split terminal echo suppressor included in each said terminal, said split terminal echo suppressor comprising means for producing a first control signal in response to communication signals originating at said terminal, means for producing a second control signal responsive to communication signals from said other terminal, means responsive to said first and second control signals for producing a first output when the first control signal is the first received and a second output when the second control signal is the first received, means responsive to said second output for suppressing said communication signals originating at said terminal, and means responsive to said first output and said second control signal concurrently for attenuating said communication signals from said other terminal.

2. A two-way voice communication system comprising first and second terminals each including a two-way transmission path and two one-way transmission paths, said one-way transmission paths of said first terminal being connected to said one-way transmission paths of said second terminal to provide two-way communication between said two-way paths, said one-way paths having transmission delay sufficient to cause simultaneous presence at each said terminal of voice signals propagating both ways, and a split terminal echo suppressor included in each said terminal, said echo suppressor comprising means for producing a first control signal in response to voice signals originating at said terminal, means for producing a second control signal responsive to voice signals from said other terminal, means responsive to said first and second control signals for producing a first output when the first control signal is the first received and a second output when the second control signal is the first received, means responsive to said second output for suppressing interrupting voice signals originating at said terminal for as long as said interrupting signals continue, and means responsive to said first output and said second control signal concurrently for attenuating but maintaining audible voice signals that were transmitted from said other terminal as noninterrupting.

3. In combination in a two-way communication system, first and second terminals each comprising a two-way terminal branch and two one-way transmission branches, said one-way transmission branches of said first terminal being connected to said one-way transmission branches of said second terminal to provide two-way communication between said terminal branches, a split terminal echo suppressor included in each said terminal comprising means differentially responsive to signals in said one-way branches for producing a first control signal indicative of speech originating at said terminal, means responsive to speech from said other terminal for producing a second control signal, means responsive to said first and second control signals for producing a first output when the first control signal is the first received and a second output when the second control signal is the first received, means responsive to said first output for blocking other terminal speech from said first control signal producing means, means responsive to said first output and said second control signal concurrently for attenuating said other terminal speech, means responsive to said second output for suppressing said originating speech, and means responsive to said second output and said first control signal concurrently for preparing said one-way branch to said other terminal to transmit said originating speech at gradually increasing volume after said second output ceases.

4. A two-way voice communication system comprising first and second terminals each including a two-way transmission path and two one-way transmission paths, said one-way transmission paths of said first terminal being connected to said one-way transmission paths of said second terminal to provide two-way communication between said two-way paths, said one-way paths having transmission delay sufficient to cause unintentional interruption at each said terminal by voice signals from said other terminal, and a split terminal echo suppressor included in each said terminal, said echo suppressor comprising means differentially responsive to voice signals in both of said one-way paths for producing a first control signal indicative of voice signals originating at said terminal, means for producing a second control signal responsive to voice signals from said other terminal, means responsive to said first and second control signals for producing a first output when the first control signal is the first received and a second output when the second control signal is the first received, said first and second outputs continuing so long as said first and second control signals continue respectively, means responsive to said second output for suppressing intentionally interrupting voice signals originating at said terminal for as long as said interrupting signals continue, means responsive to said second output and said first control signal concurrently for preparing said one-way path to said other terminal for transmission of said interrupting voice signals at a gradually increasing level after said second control signal ceases, and means responsive to said first output and said second control signal concurrently for attenuating interrupting voice signals that were transmitted from said other terminal as noninterrupting to a level that is substantially lower than the level of the first received voice signals originating at said terminal.

References Cited

UNITED STATES PATENTS 3,215,789 11/1965 Hunter et al. ______ 179—170.6

KATHLEEN H. CLAFFY, *Primary Examiner.*

H. ZELLER, *Assistant Examiner.*